Aug. 18, 1931.  F. C. BIGGERT, JR., ET AL  1,819,635
SHEARING METAL PLATES
Filed Dec. 24, 1927   8 Sheets-Sheet 1
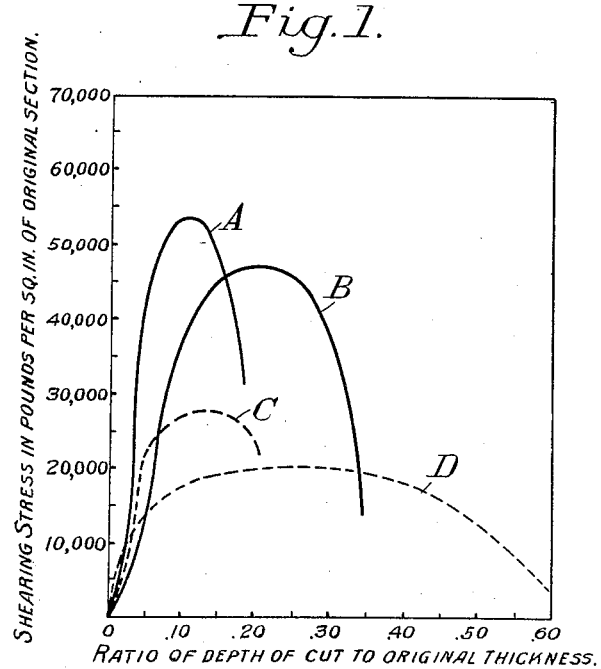
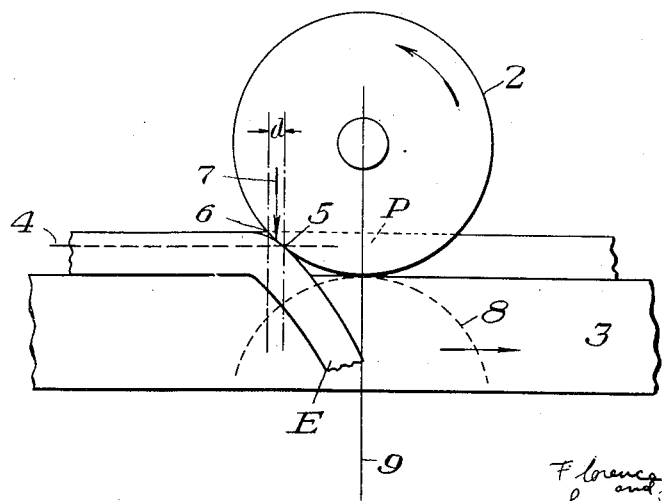

Aug. 18, 1931.  F. C. BIGGERT, JR., ET AL  1,819,635
SHEARING METAL PLATES
Filed Dec. 24, 1927  8 Sheets-Sheet 2

INVENTORS
Florence C. Biggert, Jr.
and Lane Johnson,
By Byrnes, Stebbins & Parmelee,
Their attorneys Aug. 18, 1931.  F. C. BIGGERT, JR., ET AL  1,819,635
SHEARING METAL PLATES
Filed Dec. 24, 1927   8 Sheets-Sheet 8

Patented Aug. 18, 1931

1,819,635

UNITED STATES PATENT OFFICE

FLORENCE C. BIGGERT, JR., OF CRAFTON, AND LANE JOHNSON, OF INGRAM, PENNSYLVANIA, ASSIGNORS TO UNITED ENGINEERING & FOUNDRY COMPANY, OF PITTSBURGH, PENNSYLVANIA, A CORPORATION OF PENNSYLVANIA

SHEARING METAL PLATES

Application filed December 24, 1927. Serial No. 242,366.

The invention relates to the shearing of metal plates and is designed to eliminate the bending or curling of the plates which occurs with ordinary rotary shears.

In rotary shears as ordinarily constructed the shear blades are placed with their axes in a vertical plane and the plate to be sheared is fed horizontally.

The work of shearing a piece of metal varies for any particular metal in accordance with a well defined curve. In shearing ordinary soft steel, for example, the shearing stress in pounds per square inch of original section rises rapidly from the initiation of the cut until such cut has reached a depth of approximately 20% of the original thickness of the piece being sheared. It then drops off fairly rapidly and by the time the shear blade has penetrated for approximately one-third of the thickness of the section the remaining metal is practically torn through and the shearing work is completed.

Rotary shear blades for metal plates are placed with their cutting edges either overlapping or at least so close together that their edges are substantially tangent. It follows, therefore, that the shearing force is applied, not in the line which is the common center line of the two shear blades, but in a line which is spaced away from such common center line and toward the unsheared metal.

Plate shears are generally designed for trimming off the edge of the plate as rolled and are frequently operated in spaced pairs so as to produce plates of a desired width. The lower shear blade is placed under the body of the plate proper and the upper shear blade is placed over the portion of the metal which is to be sheared away. The lower shear blade constitutes the support for the plate, and furnishes the resistance to the shearing force applied through the upper shearing blade.

From the foregoing it will be seen that this resistant force is not supplied in the same straight line as the shearing force, and therefore there is a constant tendency to curl the edge of the plate, because the portion of the plate extending between the point of application of the shearing force and the tangent point of the plate with the lower supporting roll acts as a beam which resists the force couple set up by misalignment of the shearing force and the resistant force.

In order to overcome this condition we provide for supporting the plate at a point below the point of application of the shearing force. The theoretically ideal solution of the problem would consist in using a lower shear blade of infinite radius—in other words, a straight line, and supporting the plate along this blade. For practical purposes, however, where large-sized plates are being dealt with, this solution is not ordinarily feasible. The desired conditions may be approximated by using a relatively large supporting blade and a smaller cutting blade placed with their axes in a common vertical plane, always assuming that the plate is fed in a horizontal direction.

The desired effect may also be secured by placing the axes of the shear blades in a plane which is non-perpendicular to the plane of the plate being sheared. Stated in another way, this solution consists in feeding the plate at an angle to the common tangent of the shear blades.

In order to eliminate any possibility of the plate being canted by the action of the shear blades, we provide a pressure roll which engages the plate just above the lower shear blade and just in advance of the upper shear blade.

In one form of the invention differences in the width of plates being sheared and variations in the setting of the shear blades are compensated for by mounting pairs of shear blades on relatively movable frames and by providing means for imparting relative longitudinal and lateral movement between the shear blades mounted on each frame. The shear blades are given such movements by turning their supports, one form of which may be eccentrically mounted relative to the shafts for the blades. In adjusting the shearing blades for material of different thicknesses, the upper shearing blades are moved. Compensation for wear is made by moving the lower shear blades. The shear blades are actuated by driving mechanism through flexible coupling devices.

For disposing of the scrap trimmed from plates by the shear blades, scrap shears are associated with each pair of shear blades. In order to prevent the accumulation or stoppage of scrap in the scrap shears, the latter are given a movement such that when the shears are closing onto the scrap the blades are moving away from the shear blades with a minimum velocity that is at least as great as the maximum velocity of the scrap. Flexibility in the operation of the machine is secured by providing separate motor drives for the shearing blades, scrap shears and the relatively movable frames.

The accompanying drawings illustrate the present preferred embodiment of our invention, in which—

Figure 1 is a graph showing the relation between shearing stress and depth of cut;

Figure 2 is a side elevation of a shearing mechanism employing a bottom shear member of infinite radius;

Figure 3:
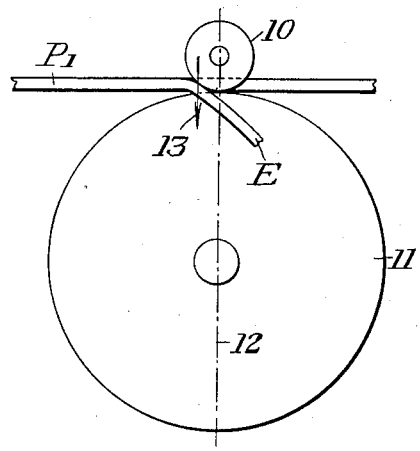
Figure 3 is a side elevation of a shear mechanism showing two shear blades of different diameter but with their common center line substantially perpendicular to the feed line of the material.

Referring first to Figure 1, the curves illustrate the shearing stress in pounds per square inch of original section at any point during the shearing operation. The curves are lettered A, B, C and D and are for different materials as follows:

Curve A—Cold Rolled Steel. Ultimate strength, 90,300 pounds per square inch; Brinell hardness, 193 average, 200 at surface.

Curve B—Soft Steel. Ultimate strength, 73,500 pounds per square inch; Brinell hardness, 193.

Curve C—Brass. Brinell hardness, 97 average, 103 at surface.

Curve D—Copper. Ultimate tensile strength, 29,450 pounds per square inch; Brinell hardness, 63.

All of these curves, and particularly curves A, B and C, which are representative of most of the materials handled in shearing apparatus, show that the shearing work is practically completed long before the cutting blade has penetrated for the full depth of the section. Curve A, for example, shows that the work of shearing cold rolled steel is practically completed before the shearing blade has penetrated 20% of the depth of the stock.

Curve B may be taken as fairly representative of most of the steels which are made into metal plates and this curve shows that the shearing work is completed when the blade has penetrated for about one-third the depth of the section.

Referring now to Figure 2, there is shown a rotary shear blade 2 cooperating with a lower supporting blade 3. The lower blade 3 is a straight line, or, in other words, is of infinite radius. The cooperating blades move in the direction indicated by arrows and are shown as shearing a metal plate P.

Assume that the plate P is made of a steel whose characteristics are shown by the curve B. If we draw a line 4 parallel to the top surface of the plate and spaced from the top surface a distance corresponding to one-third of the plate thickness, it will intersect the working edge of the shear blade 2 at a point 5.

From the foregoing it will be seen that all of the shearing work will be done by the shear blade 2 within a horizontal distance defined by two vertical lines, one of these being drawn through the point 5 and the other being drawn through the point of intersection of the top face of the plate P with the shearing edge of the blade 2. This point is indicated at 6 in Figure 2 and the distance $d$ represents that portion of the apparatus in which the shearing work is being done.

If all the forces exerted by each point within the working range of the shear were added together, they would produce a force vector which is represented at 7 and of course this force is resisted by the lower shearing blade 3. The resistance is supplied immediately below the force vector and therefore there is no tendency to cant or bend the plate.

Assume, however, that instead of using the blade 3 an ordinary circular blade of the same size as the blade 2 were employed. This is indicated in dash lines at 8. It will be seen that the blade does not bear against the lower face of the plate P, except at a point lying in the common center line 9 of the two blades. This means that that portion of the plate P which lies between the vector 7 and the line 9 is subjected to a very large bending force and this accounts for the curving which is encountered with ordinary shears. By the provision of a supporting member directly opposite the shearing force, we overcome this condition.

In commercial shears, where very large plates are handled, it is not always feasible to provide a flat shear blade and move it with the plate. Figure 3 shows a form of shear in which the advantages of the construction shown in Figure 2 are realized to a material degree. The upper shear blade is indicated at 10 and the lower shear blade 11 is also made circular but is of materially larger diameter than the blade 10. The plate $P_1$ is fed to the shear blades at substantially right angles to the common center line 12 of the two blades. The vector representing the shearing forces is indicated at 13, and of course, the shear shown in Figure 3 is theoretically open to the same objection as the ordinary rotary shear wherein the blades are of the same size. It will be appreciated, however, that with the very large lower blade 11, its curvature will be so slight that for all practical purposes the blade will be in engagement with the plate at a point in the line 13. By the provision of blades of different size, the curling tendency is obviated or minimized because while the plate will be deflected to a certain degree, such deflection will not be in an amount sufficient to impart a permanent bend to the plate.

Figure 4:
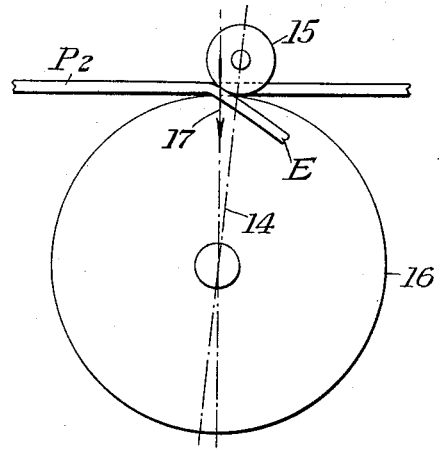
Figure 4 is a similar view showing the material being fed at an angle to the common tangent of the blades.

The objection to the shear of Figure 3 may be overcome by feeding the plate to the shears at such an angle that the shear force vector intersects the point of tangency of the plate and the lower shear blade. As is shown in Figure 4, this will ordinarily mean that the vector intersects the axis of the lower blade. In this embodiment of the invention, the plate $P_2$ is fed in a horizontal direction, but the common center line 14 of the upper shear blade 15 and the lower shear blade 16 is not in a vertical line. On the contrary, it is at such an angle that the shear force vector 17, if projected, would pass through the axis of the lower shear blade.

The particular angle will depend upon the relative sizes of the two blades, but if we consider curve B as fairly representative of ordinary shearing conditions, it will be seen that the line 14 must be at such an angle to the line of feed of the plate $P_2$ that the upper or "active" shear blade shall not have penetrated the plate for more than 35% of its depth at a point where the edge of the active shear blade is intersected by a line drawn perpendicular to the line of feed and passing through the axis of the lower or supporting blade.

Figure 5:
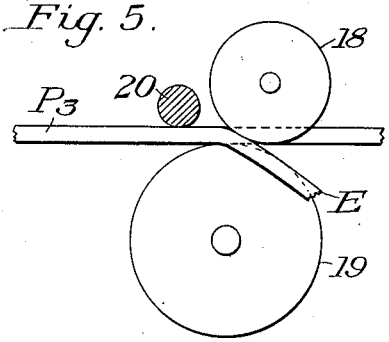
Figure 5 is a similar view showing a hold down means cooperating with the lower shear blade.
Figure 9:
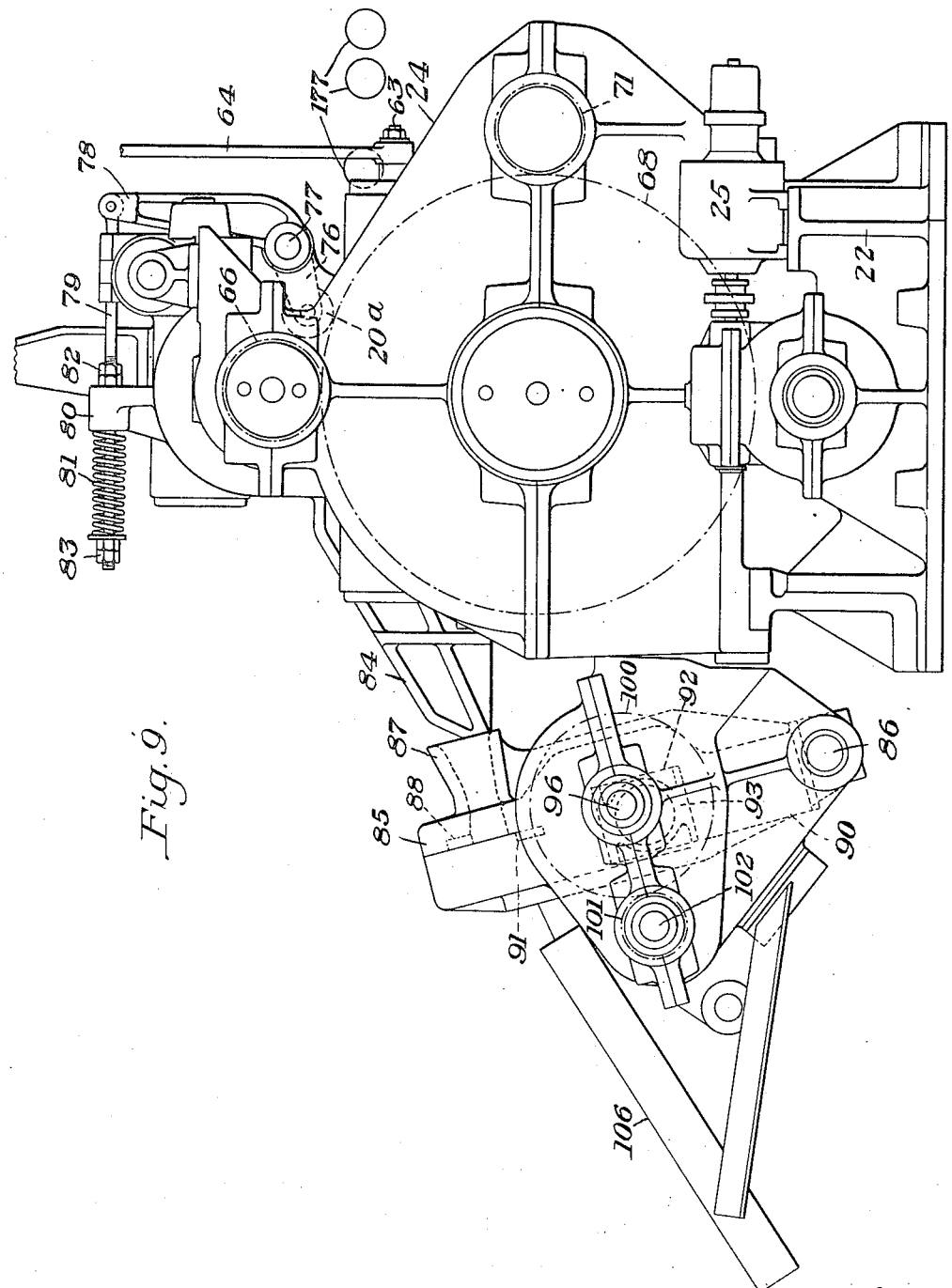
Figure 9 is an end view thereof.

While it is true that the shearing work is mainly done at the early stages of the cut, it is usually necessary that the active blade be so positioned that it penetrates the entire plate. Otherwise, there would be danger of incomplete or ragged cuts. Since the plate is necessarily of material thickness, such blade portions do work in bending the sheared edge E out of the way. This, of course, tends to cant the plate in some degree, and we therefore provide a resistant force. Figure 5 shows a pair of shear blades having means for resisting such canting action. The upper shearing blade 18 and the lower blade 19 are arranged substantially as shown in Figure 4, except that they are more nearly of the same size. The plate $P_3$ is fed to the blades at an angle to their common center line, just as in Figure 4. The plate is advanced by any suitable means, for example, over rolls 177 (Fig. 9). The sheared edge E of the plate is curled downwardly, and a roll 20, bearing on the upper surface of the plate and lying generally above the axis of the shear blade 19, is provided. This roll effectually prevents any canting to the plate proper.

Figure 6:
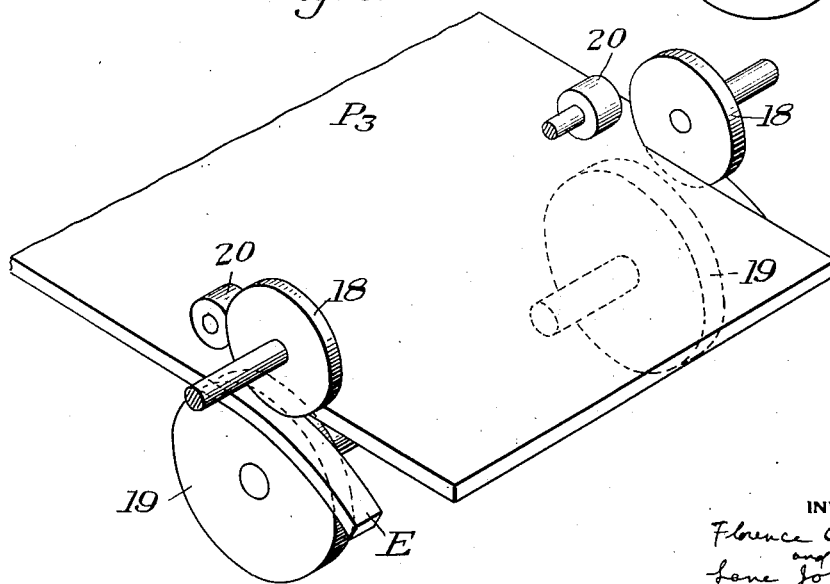
Figure 6 is a perspective view illustrating a pair of shears such as shown in Figure 5 trimming a plate at each edge thereof.
Figure 7:
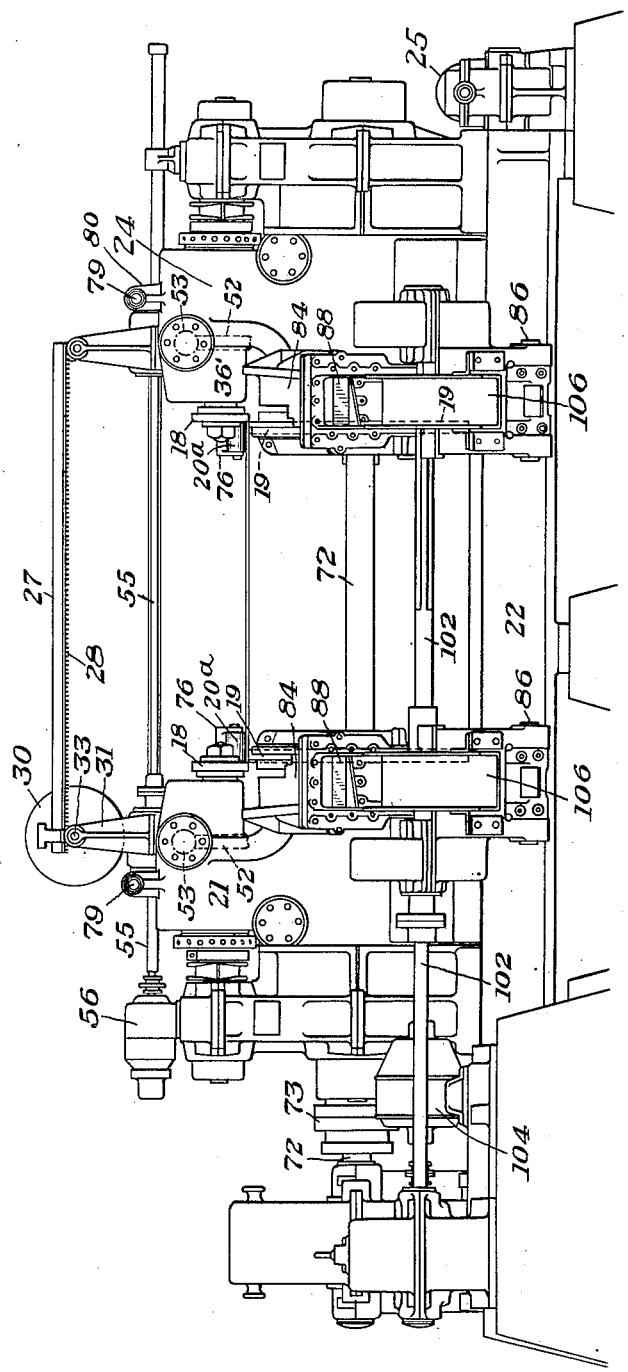
Figure 7 is an elevational view of a shearing machine embodying our invention.

Figure 6 diagrammatically shows our invention applied to the shearing of a plate at both edges and the same reference characters are employed as in Figure 5. It will be seen from Figure 5 that the shears are arranged in spaced pairs so as to trim off each edge of a rolled plate and produce a piece of constant width from end to end.

Figures 7 to 11, inclusive, show in detail a shear employing rotary blades of different diameter. A small blade 18 and a large blade 19 are supported by a stationary frame 21 mounted on a bed 22. A similar pair of blades is mounted on a frame 24, which frame is adjustable relative to the frame 21 so that plates of different width may be cut. Movement of the frame 24 is effected by a motor 25, connected through worm gearing 26 with a lead screw 26a journaled in the bed 22. The frame 24 carries a nut 26b which is engaged by the lead screw. A protective shroud or shield 26c for the end of lead screw 26a is carried by the frame 24.

Accurate setting of frame 24 relative to frame 21 is assured by the provision of a position gauge 27. The position gauge 27 comprises a rack 28 secured to the frame 24 and a pointer 29 cooperating with a dial 30 carried by a support 31 on the frame 21. The rack 28 meshes with a pinion 32 keyed to a shaft 33 supporting the pointer 29. The dial 30 is provided with suitable indicia co-operating with the pointer for indicating the relative positions of the frames.

Since the details of frames 21 and 24 are similar except insofar as it is necessary to provide for the relative movement between them, frame 24 is described in detail, it being understood that the construction of frame 21 is substantially similar to that of frame 24 except as to the details hereinafter specifically set forth.

Figure 10:
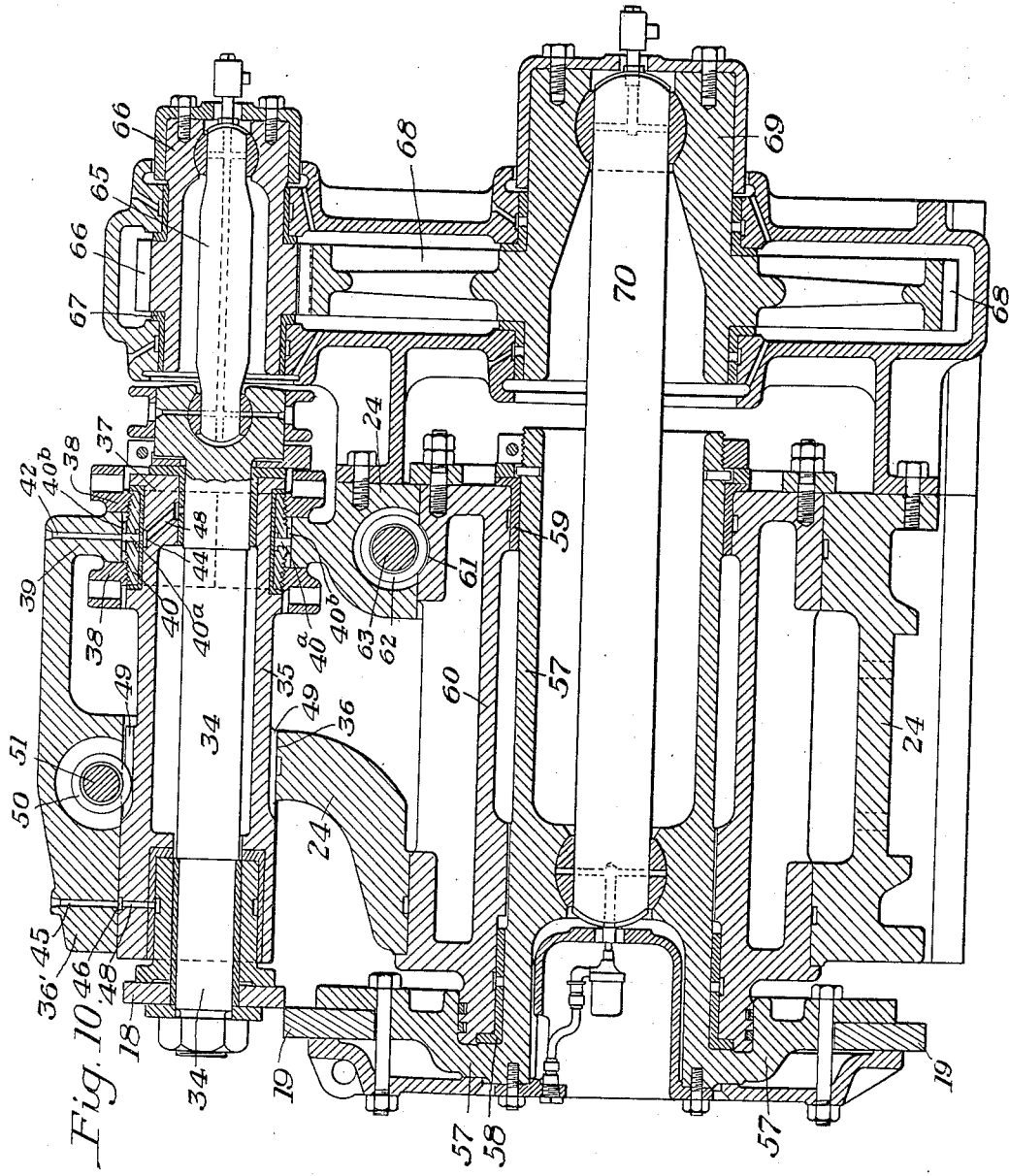
Figure 10 is a vertical longitudinal sectional view of a portion of the shearing machine taken along the line X—X of Figure 8.
Figure 11:
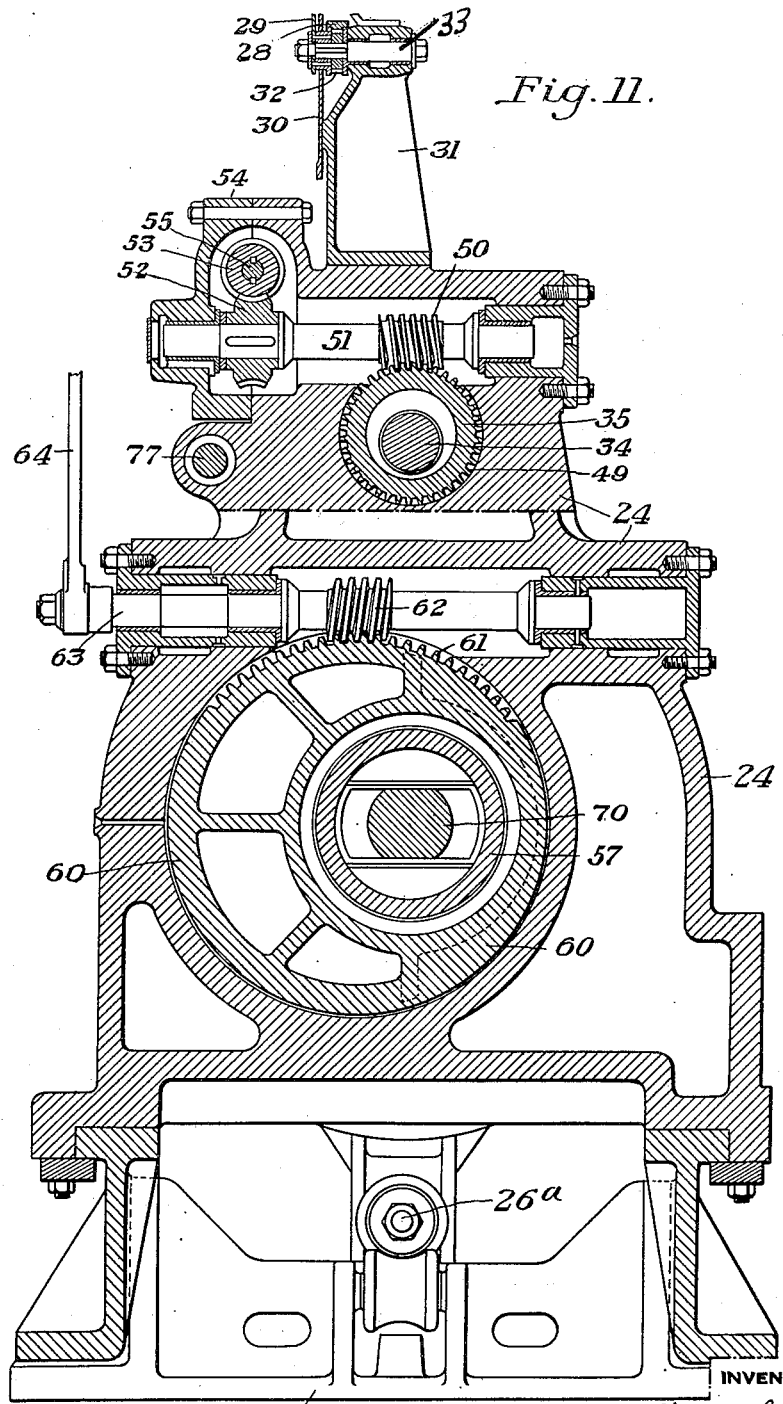
Figure 11 is a vertical transverse sectional view taken along the line XI—XI of Figure 8.
Figure 12:
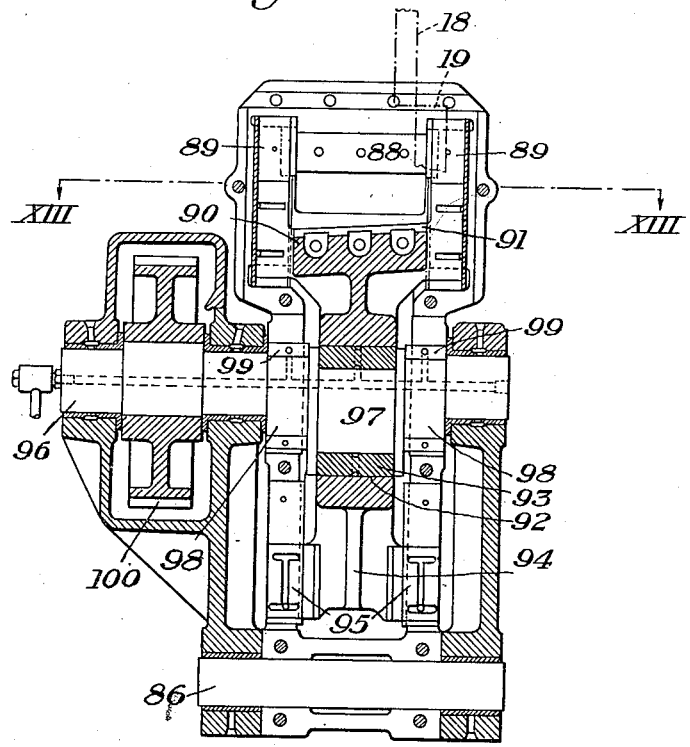
Figure 12 is a vertical longitudinal sectional view of the scrap shears.
Figure 13:
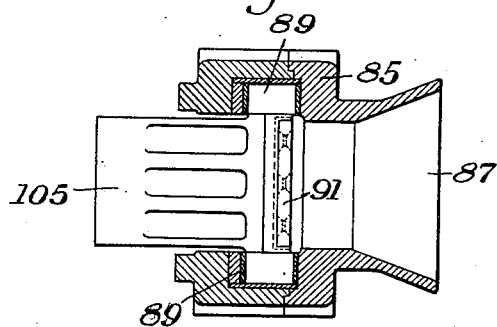
Figure 13 is a sectional view of a detail of the driving mechanism.

Referring, particularly, to Figures 10 and 11, adjustment of the cutting blade 18 relative to the blade 19 is obtained by a lateral and longitudinal movement of a shaft 34 carrying the blade 18. The shaft 34 is supported in a member 35 which is circular in cross section but whose axis is eccentric to the axis of the shaft 34. One end of the support 35 rests in a seat 36 in the frame 24. The frame is provided with a horn 36' which extends outwardly over the support 35 so as to provide resistance adjacent the shear blade 18 for the spreading force between the blades arising during the shearing operation.

Longitudinal movement of the shaft 34 and its support 35 to vary the cutting position of the blade 18 is secured by an adjustable bearing 37. The bearing 37 comprises threaded rings 38 mounted on opposite sides of a web 39 of the frame 24 and threaded onto opposite ends of a bearing shell 40. The shell is lined to form a rear bearing for the support 35, and as indicated in dotted lines, is made in halves to make assembly possible. The bearing shell makes a sliding fit in the opening formed in the web 39. The rings 38, when tightened, bear against opposite sides of the web 39 and hold the support 35, with its shaft 34, against endwise movement. The shell 40 is split to permit of its being mounted in its seat. The complementary parts of the shell are held together in their seat by the rings 38. In order to permit relative movement of the rings 38 on the shell 40, the latter is made non-rotatable in the frame by the provision of pins 40a extending outwardly into slots 40b. The pins 40a are hollow to permit the passage of lubricant therethrough. Rotation of the rings 38 effects movement of the bearing shell 40 relative to the frame 24 and a corresponding longitudinal adjustment of the support 35 in the frame.

Lubrication of the bearing is secured by an oil duct 42 extending downwardly from the top of the frame 24 and through the shell 40 to an oil groove 44 in the journal portion of the support 35. An oil conduit 45 supplies lubricant to the support 35 adjacent its outer end. A groove 46 is formed in the support 35 below the oil conduit 45 and extends a substantial distance around the periphery of the support. Conduits 48 lead from the grooves 44 and 46 to the bearings which are formed in the support for the shaft 35.

The upper shear blades are arranged for ready lateral adjustment by rotation of the eccentric supports 35. Each support is provided with gear teeth 49 on its outer periphery. These teeth engage worms 50 on shafts 51 (Figure 11). The teeth 49 are elongated so as to permit of axial adjustment of the support 35 without disturbing the connection between the teeth and the worms 50. The outer surfaces of the lower teeth 49 constitute bearing surfaces for the support 35.

Each worm shaft 51 carries a worm wheel 52. These worm wheels mesh with worms 53. The worms and worm wheels 52 and 53 are carried in cases 54 on top of the frames 21 and 24. A shaft 55 extends through the cases 54 and is arranged to be driven by a motor 56. The worm wheel 53 for the stationary frame 21 is keyed to the shaft, while the worm wheel 53 for the movable frame 24 makes a splined connection therewith, so that the frame may be adjusted. With this arrangement, rotation of the shaft 55 by the motor 56 is effective for simultaneously and equally adjusting both supports 35. This adjustment will likely be made in practice at rather frequent intervals, so as to secure a most desirable relationship between the upper and lower blades for the particular material being cut.

Provision is also made for adjusting the lower blade, although this adjustment will ordinarily be required only to take care of wear in the lower blades. Each lower blade 19 is mounted on a spindle 57 running in bearings 58 and 59. These bearings are carried by a barrel 60, which barrel is journaled in the frame 21 or 24. The spindle 57 is eccentric to the barrel. (Fig. 11.)

Gear teeth 61 are formed around a portion of the periphery of each barrel 60 and these teeth are engaged by a worm 62 on a shaft 63, journaled in the frame. A hand lever 64 is provided for rotating the shaft 63 and thus effecting adjustment of the barrel 60.

It will be noted from Figure 11 that the axis of the spindle 57 is offset substantially horizontally with respect to the axis of the barrel 60. It will also be noted that the axis of the shaft 34 is offset vertically with respect to the axis of the support 35. Figure 11 shows the parts in a normal intermediate position and it will be understood that they will depart from the positions shown upon adjustment. However, by reason of the spindle 57 being offset horizontally, the principal direction of adjustment of the spindle 57 is in the vertical direction, while the principal direction of adjustment of the shaft 34 is in the horizontal direction, thus simplifying the relative adjustment of the upper and lower blades.

The worm and gear connections employed for adjusting the support 35 and the barrel 60 constitute "irreversible" connections so that the tendency of the support 35 and the barrel 60 to depart from adjusted position is minimized. The gear connections between the motor 56 and the worm shafts 51 effectively lock the worms 50 against rotation.

Since both the upper and lower blades are made adjustable, it is necessary to provide a drive which will permit of making such adjustment. We employ spindles of the type shown and described in the Patent No. 1,044,173 to Geer. A spindle 65 is connected to the shaft 34 at the end remote from the blade 18. The opposite end of the spindle 65 lies inside of a hollow pinion 66 and is connected thereto so that rotation of the pinion 66 is effective for driving the shaft 34 and through it the blade 18. The pinion 66 is carried by bearings 67 in the frame. The pinion 66 meshes with a gear 68 which is also journaled in the frame. The hub 69 of the gear 68 is made hollow to receive the spindle 70, which, as above stated, is of the Geer type. The pinion 66 is substantially co-axial with the shaft 34 and the gear 68 is substantially co-axial with the spindle 57, although this relationship will be varied upon adjustment of the support 35 or the barrel 60. The pitch diameters of the pinion 66 and the gear 68 are substantially the same as the diameters of the cutting blades 18 and 19, respectively, so that the blades are operated at the same peripheral speed.

Each gear 68 meshes with a pinion 71 journaled one in the frame 21 and one in the frame 24. The pinions 71 are substantially co-axial, the pinion for the fixed frame 21 being keyed to a shaft 72, and the pinion for the movable frame 24 making a splined connection with that shaft. The shaft 72 is connected through a coupling 73 to the power shaft of a reducing gear set 74, driven by a motor 75.

In order to prevent canting of the plate, rollers 20a, corresponding to the rollers 20 of Figure 6, are employed. These rollers are mounted in arms 76 keyed to stub shafts 77 in the frames, and arms 78 are connected to the outer end of each stub shaft and carry a pull rod 79 which extends through a bracket 80 and carries a spring 81. The spring tends to force rollers 20a toward the lower shear blade, this movement being limited by stop nuts 82 on the rod 79. If the plate being sheared tends to cant upwardly, its movement is resisted by the spring 81 through the linkage just described. The amount of pressure exerted by the rollers 20a may be adjusted by changing the degree of initial compressure of the spring 81. Nuts 83 are provided for this purpose.

When the shear is in operation the shear scrap is bent downwardly by the upper blades and, being still connected at its rear end to the plate being sheared, issues as a long narrow strip on the exit side of the machine where troughs 84 receive the shear scrap and guide it into a reciprocating shear.

The reciprocating shear comprises a frame 85 rockable about a pin 86. A bell mouth 87 is provided on the side frame adjacent the trough 84 to receive and guide the leading end of a strip. The frame 85 carries a fixed upper shear blade 88 and is provided with ways 89 having a slide 90 carrying a cooperating movable shear blade 91. The slide 90 has a rectangular opening 92 formed therein and a block 93 is slidably mounted in this rectangular opening. The slide 90 has a foot extension 94 working in ways 95 near the bottom of the frame 82, so that while it is free to slide toward and away from the fixed blade 91, it cannot rock relative to the frame 85.

The slide 90 for the shear blade 91 is actuated by a shaft 96 having formed thereon an eccentric 97, which eccentric is surrounded by the block 93. As the shaft rotates, the block 93 slides sidewise but forces the frame 90 to slide up and down toward and away from the fixed blade 88.

The shaft 96 also carries eccentrics 98, which eccentrics are engaged by blocks 99. The blocks 99 are slidable vertically in the frame 85 so that as the shaft 96 rotates, the frame 85 is rocked about the pin 86. The shaft 96 carries a driving gear 100 meshing with a pinion 101. The pinion 101 for the fixed side of the machine is keyed to a shaft 102, while the corresponding pinion for the adjustable side of the machines makes a splined connection with said shaft. The shaft 102 is driven through reducing gearing 103 from a motor 104.

Figure 8:
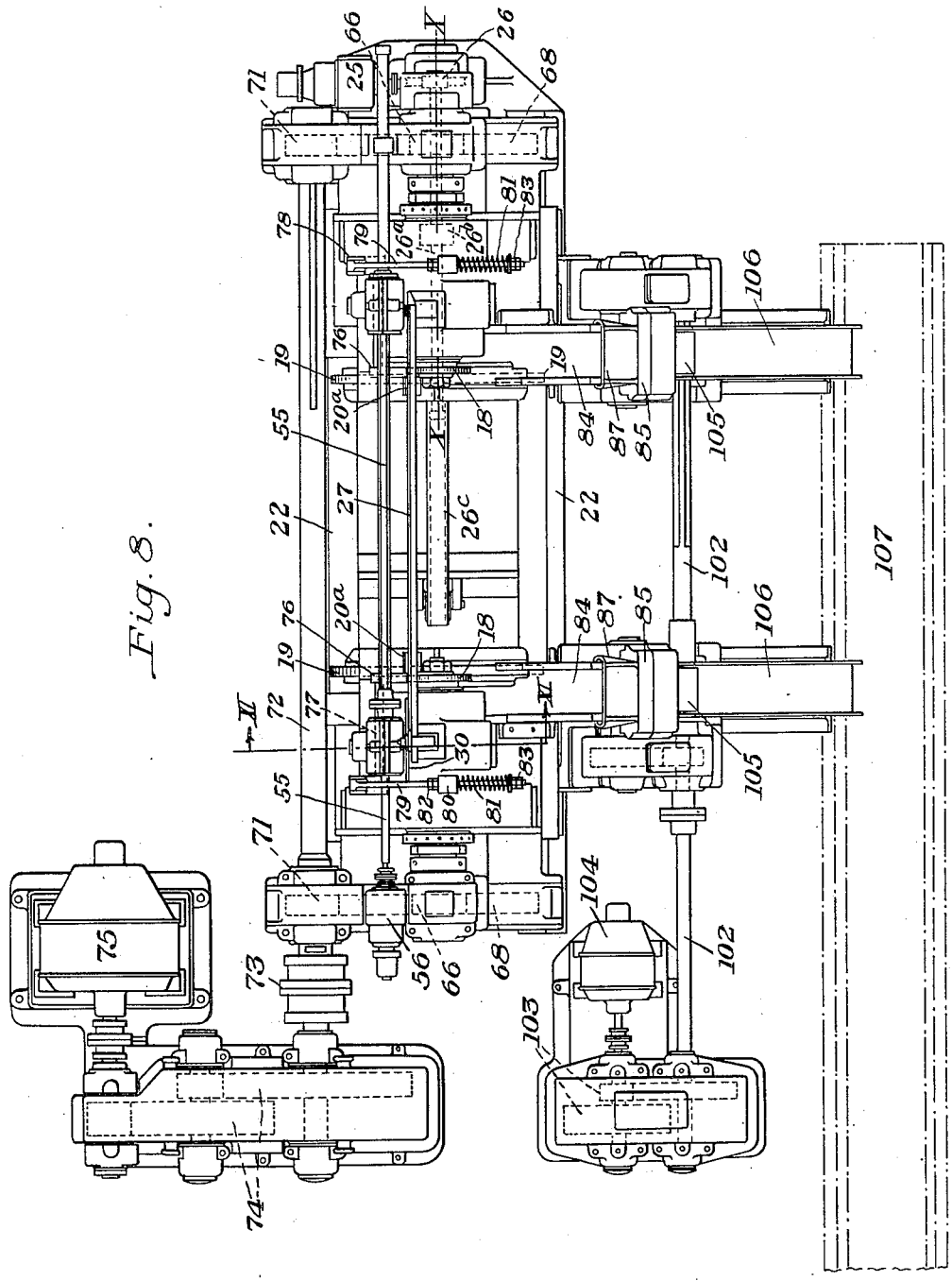
Figure 8 is a plan view thereof.

It will be noted from Figure 9 that the bell mouth 87 is so shaped as to guide the scrap in a line which passes just below the fixed blade 88 of the shear. The eccentrics 97 and 98 are so timed that the two blades are moved into cutting engagement at substantially the point when the frame 85 is travelling at maximum velocity in the direction of movement of the scrap. The motor 104 is driven at such speed that the component of velocity of the shear blades along the line of travel of the scrap is at least equal to the maximum velocity of the scrap being sheared. It is found that if the scrap shears are operated at such a speed that this component of velocity is less than the velocity of the scrap, the scrap strikes the shear blades and buckles or twists. If the scrap shears are operated at a proper speed, the scrap will be sheared into short lengths which are discharged onto chutes 105, carried by the movable frame 85 and leading to a fixed chute 106. The chute 106 may discharge onto a scrap conveyor 107 as shown in Figure 8, or the scrap can be collected and taken away at intervals as desired.

While we have illustrated and described the preferred form of our invention, it will be understood that it may be otherwise embodied within the scope of the following claims.

We claim:

1. In combination, a plurality of rotary cutting blades, rotatable eccentric supporting means for the cutting blades, and means for rotating the supporting means to vary the angle of intersection between a plane defined by the axes of the blades and the plane of material passing the blades.

2. In combination, a plurality of rotary cutting blades, eccentric supporting means for the cutting blades, and means for independently moving the supporting means associated with each blade for shifting the angle of intersection between the plane defined by the axes of the blades and the plane of material passing the blades.

3. In combination, a frame, a pair of cooperating cutting blades mounted for relative lateral movement and supported by the frame, driving means and connecting means between the driving means and the blades, the connecting means permitting relative lateral movement between the blades while connected to the driving means.

4. In a shear, a rotary shear blade, a shaft therefor, means for rotating the shaft, adjustable supporting means for the shaft whereby the lateral position of the shaft may be varied, teeth carried by the support, driving means engaging the teeth and effective for adjusting the supporting means, and means for adjusting the supporting means longitudinally of the shaft, the teeth being sufficiently long to maintain engagement with the driving means upon such longitudinal movements.

5. A rotary shear comprising a pair of shear blades, means for laterally adjusting the axis of at least one of such blades, a drive shaft for each blade, and driving means having universal joint connections with the drive shafts.

6. A rotary shear comprising a pair of shear blades, means for laterally adjusting the axis of at least one of such blades, a drive shaft for each blade, and a drive spindle having universal joint connections with the drive shafts and the shear blades, and means for adjusting a shear blade in an axial direction, the spindle connection for said blade being so formed as to permit corresponding endwise adjustment.

7. A rotary shear comprising a pair of shear blades, means for laterally adjusting the axis of each blade, a pair of meshing gears whose pitch diameter corresponds generally to the diameter of the blades, and drive spindles making universal joint connections between the drive shafts and the shear blades.

8. An apparatus for shearing metal plates, comprising rotary shear blades mounted so that the immediate cutting portions of said blades have a common tangent, means for feeding a plate to the shear blades at an angle to said common tangent, and means on the material receiving side of said blades adapted to engage and apply pressure to said plate opposite the shearing blade which first engages the plate to overcome the buckling effect thereon of said blades.

9. Apparatus for shearing metal plates, comprising a pair of rotatable shear blades so mounted that the immediate shearing portions thereof have a common tangent, and means for guiding a substantially flat plate between said blades and at an angle to said common tangent thereof and with one flat face of the plate in approximate alignment with the point of tangency of said blades.

10. Apparatus for shearing metal plates, comprising a pair of rotatable shear blades so mounted that the immediate shearing portions thereof have a common tangent, means for guiding a substantially flat plate between said blades and at an angle to said common tangent thereof and with one flat face of the plate in approximate alignment with the point of tangency of said blades, and means for varying the angle of intersection between a plane defined by the axes of said blades and the plane of said metal plate.

11. Apparatus for shearing metal plates, comprising a pair of rotatable shear blades so mounted that the immediate shearing portions thereof have a common tangent, means for guiding a substantially flat plate between said blades and at an angle to said common tangent thereof and with one flat face of the plate in approximate alignment with the point of tangency of said blades, and means for adjusting said shear blades axially with relation to each other.

12. Apparatus for shearing metal plates, comprising a pair of rotatable shear blades so mounted that the immediate shearing portions thereof have a common tangent, means for guiding a substantially flat plate between said blades and at an angle to said common tangent thereof and with one flat face of the plate in approximate alignment with the point of tangency of said blades, means for varying the angle of intersection between a plane defined by the axes of said blades and the plane of said metal plate, and means for adjusting said shear blades axially with relation to each other.

13. Apparatus for shearing metal plates, comprising a rotary shear blade, a rotary supporting blade of materially greater diameter than said shear blade, said shear blades being mounted so that their immediate shearing portions have a common tangent, and means for guiding a substantially flat plate between said blades and at an angle to said common tangent thereof and with one flat face of the plate in approximate alignment with the point of tangency of said blades.

14. Apparatus for shearing metal plates, comprising a rotary shear blade, a rotary supporting blade of materially greater diameter than said shear blade, said shear blades being mounted so that their immediate shearing portions have a common tangent, means for guiding a substantially flat plate between said blades and at an angle to said common tangent thereof and with one flat face of the plate in approximate alignment with the point of tangency of said blades, and means for varying the angle of intersection between a plane defined by the axes of said blades and the plane of said metal plate.

15. Apparatus for shearing metal plates, comprising a rotary shear blade, a rotary supporting blade of materially greater diameter than said shear blade and affording, opposite the shearing forces applied by said shear blade, a long arcuate support maintaining the sheared edge of such plate substantially in the plane of the main body thereof.

16. Apparatus for shearing metal plates, comprising a rotary shear blade, a rotary supporting blade of materially greater diameter than said shear blade and affording, opposite the shearing forces applied by said shear blade, a long arcuate support maintaining the sheared edge of such plate substantially in the plane of the main body thereof, said blades having no overlap.

17. Apparatus for shearing metal plates, comprising a rotary shear blade, a rotary blade of materially greater diameter than said shear blade and affording, opposite the shearing forces applied by said shear blade, a long arcuate support maintaining the sheared edge of such plate substantially in the plane of the main body thereof, and means for varying the angle of intersection between the plane defined by the axes of said blades and the plane of metal plate being sheared thereby.

In testimony whereof we have hereunto set our hands.

FLORENCE C. BIGGERT, Jr.
LANE JOHNSON.